(12) United States Patent
Edwards et al.

(10) Patent No.: US 9,311,126 B2
(45) Date of Patent: Apr. 12, 2016

(54) SYSTEM AND METHOD FOR VIRTUAL PARTITION MONITORING

(75) Inventors: Jonathan L. Edwards, Portland, OR (US); Gregory W. Dalcher, Tigard, OR (US); John D. Teddy, Portland, OR (US)

(73) Assignee: McAfee, Inc., Santa Clara, CA (US)

( * ) Notice: Subject to any disclaimer, the term of this patent is extended or adjusted under 35 U.S.C. 154(b) by 79 days.

(21) Appl. No.: 13/192,412

(22) Filed: Jul. 27, 2011

(65) Prior Publication Data
US 2013/0031291 A1    Jan. 31, 2013

(51) Int. Cl.
G06F 21/55     (2013.01)
G06F 21/56     (2013.01)
G06F 9/455     (2006.01)

(52) U.S. Cl.
CPC .......... *G06F 9/45558* (2013.01); *G06F 21/554* (2013.01); *G06F 21/56* (2013.01); *G06F 2009/45583* (2013.01)

(58) Field of Classification Search
USPC ............................................. 711/6, E12.016
See application file for complete search history.

(56) References Cited

U.S. PATENT DOCUMENTS

| 5,987,610 | A | 11/1999 | Franczek et al. | |
|---|---|---|---|---|
| 6,073,142 | A | 6/2000 | Geiger et al. | |
| 6,460,050 | B1 | 10/2002 | Pace et al. | |
| 7,506,155 | B1 | 3/2009 | Stewart et al. | |
| 2006/0026569 | A1 | 2/2006 | Oerting et al. | 717/126 |
| 2006/0206892 | A1 | 9/2006 | Vega et al. | |
| 2007/0106986 | A1 | 5/2007 | Worley | |
| 2007/0180509 | A1 | 8/2007 | Swartz et al. | |
| 2008/0134175 | A1 | 6/2008 | Fitzgerald et al. | |
| 2008/0134176 | A1 | 6/2008 | Fitzgerald et al. | |
| 2008/0134177 | A1 | 6/2008 | Fitzgerald et al. | |
| 2008/0134178 | A1 | 6/2008 | Fitzgerald et al. | |
| 2008/0184225 | A1 | 7/2008 | Fitzgerald et al. | |
| 2008/0256536 | A1 | 10/2008 | Zhao et al. | |
| 2009/0044024 | A1 | 2/2009 | Oberheide et al. | |
| 2009/0327576 | A1 | 12/2009 | Oshins | |
| 2010/0205669 | A1 | 8/2010 | Mantripragada et al. | |
| 2010/0235836 | A1 | 9/2010 | Bratanov | |

(Continued)

FOREIGN PATENT DOCUMENTS

| EP | 2 737 395 A2 | 6/2014 | |
|---|---|---|---|
| WO | WO 2008/008401 | 1/2008 | ............. G06F 12/14 |

(Continued)

OTHER PUBLICATIONS

"Rebasing Win32 DLLs", Thiadmer Riemersma, Dec. 1, 2000 http://www.drdobbs.com/rebasing-win32-dlls/184416272.*

(Continued)

*Primary Examiner* — Michael Alsip
(74) *Attorney, Agent, or Firm* — Baker Botts L.L.P.

(57) ABSTRACT

A method is provided in one example embodiment that includes rebasing a module in a virtual partition to load at a fixed address and storing a hash of a page of memory associated with the fixed address. An external handler may receive a notification associated with an event affecting the page. An internal agent within the virtual partition can execute a task and return results based on the task to the external handler, and a policy action may be taken based on the results returned by the internal agent. In some embodiments, a code portion and a data portion of the page can be identified and only a hash of the code portion is stored.

19 Claims, 6 Drawing Sheets

(56) References Cited

U.S. PATENT DOCUMENTS

| | | | |
|---|---|---|---|
| 2010/0251238 A1* | 9/2010 | Schuba et al. | 718/1 |
| 2010/0281273 A1 | 11/2010 | Lee et al. | |
| 2010/0306764 A1 | 12/2010 | Khanna | |
| 2010/0306769 A1 | 12/2010 | Schneider | |
| 2011/0167472 A1* | 7/2011 | Evans et al. | 726/1 |
| 2011/0167494 A1 | 7/2011 | Bowen et al. | |

FOREIGN PATENT DOCUMENTS

| | | |
|---|---|---|
| WO | WO 2012/170709 | 12/2012 |
| WO | 2013016567 A2 | 1/2013 |
| WO | 2013016567 A3 | 4/2013 |

OTHER PUBLICATIONS

VMware VMsafeTM Partner Program, http://www.vmware.com/technical-resources/security/vmsafe/security_technology.html, copyright 2011, VMware, Inc., printed Jul. 28, 2011.

Jiang, et al., "Stealthy Malware Detection Through VMM-Based 'Out-of-the-Box' Semantic View Reconstruction," CCS '07, Oct. 29-Nov. 2, 2007, copyright 2007 ACM 978-1-59593-703—Feb. 7, 2011.

Murray, James D., Making Hash Sets from VMware Virtual Machines, http://www.techexams.net/blogs/jdmurray/making-hash-sets-from-vmware-virtual-machines/, printed Jul. 24, 2011.

Revisit—Improved Support for Application White Listing (AppLocker for Windows 7), VMware ThinApp Blog, Apr. 16, 2010, copyright 2011, VMware, Inc.

U.S. Appl. No. 11/673,762, filed Feb. 12, 2007, entitled "System, Method and Computer Program Product for Utilizing Code Stored in a Protected Area of Memory for Security an Associated System".

U.S. Appl. No. 11/949,609, filed Dec. 3, 2007, entitled "System, Method and Computer Program Product for Performing a Security or Maintenance Operation in Association with Virtual Disk Data".

U.S. Appl. No. 13/155,572, filed Jun. 8, 2011, entitled "System and Method for Virtual Partition Monitoring".

Notification of Transmittal of the International Search Report and the Written Opinion of the International Searching Authority, or the Declaration, International Application No. PCT/US2012/041384, mailed Dec. 6, 2012, 9 pages.

Notification of Transmittal of the International Search Report and the Written Opinion of the International Searching Authority, or the Declaration, International Application No. PCT/US2012/048386, mailed Feb. 13, 2013, 9 pages.

International Preliminary Report on Patentability received for PCT Application No. PCT/US2012/048386 mailed on Jan. 28, 2014, 9 Pages.

Nance and Hay, "Virtual Machine introspection: Observation or Interference?", IEEE Computer Society, vol. 6, No. 5, pp. 32-36, Sep. 1, 2008.

Litty and Lie, "Manitou: A Layer-Below Approach to Fighting a Malware", Proceedings of the 1st Workshop on Architectural and System Support for Improving Software Dependability, ASID '06, pp. 6-11, Jan. 1, 2006.

Extended European Search Report issued in EP Appl. No. 12816928.1-1954; 8 pages, Mar. 6, 2015.

* cited by examiner

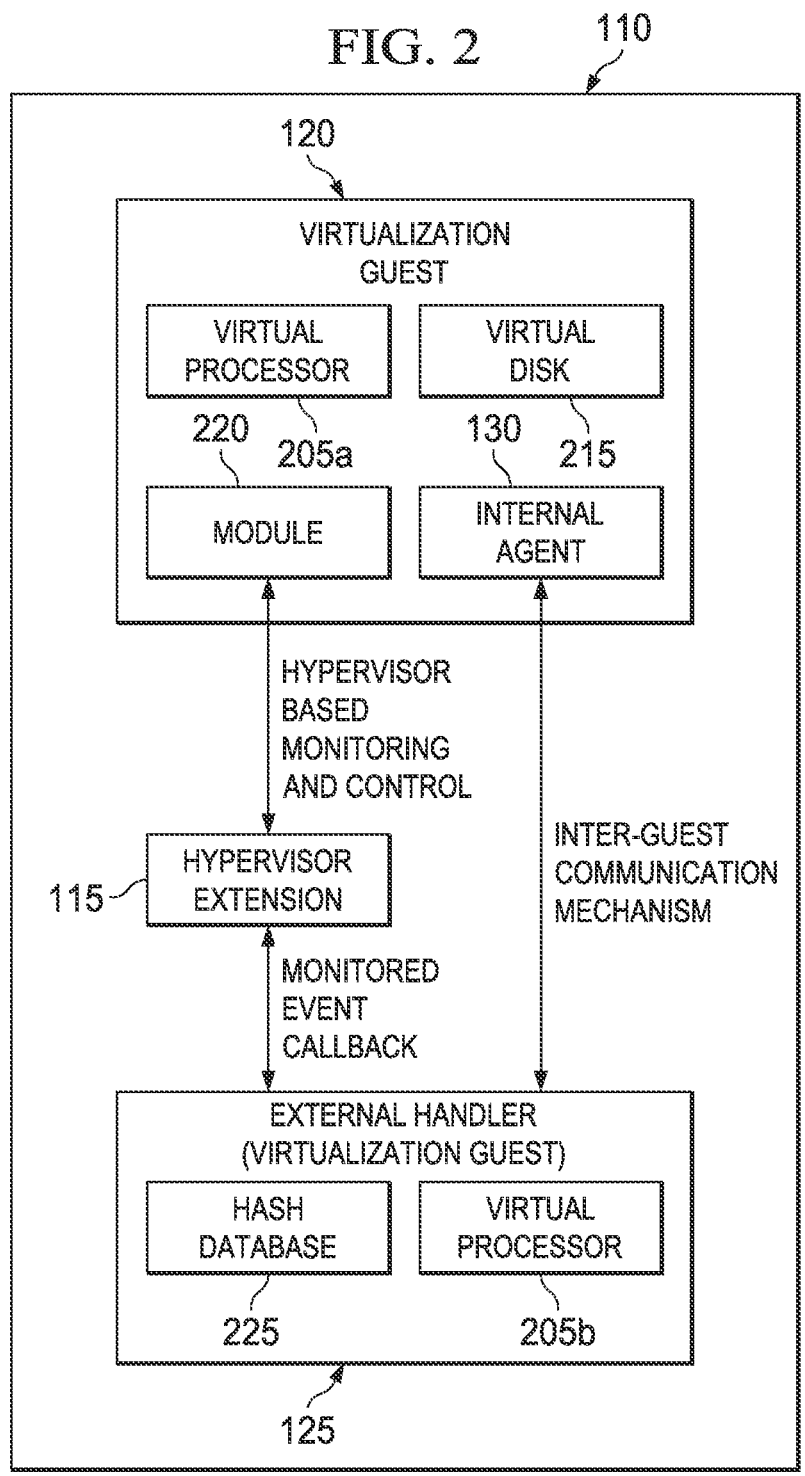

SYSTEM AND METHOD FOR VIRTUAL PARTITION MONITORING

TECHNICAL FIELD

This specification relates in general to the field of information technology security, and more particularly, to a system and method for virtual partition monitoring.

BACKGROUND

The evolution of virtualization techniques in information technology has led to a variety of applications, from cloud-based computing to embedded systems in mobile phones. In general, virtualization obscures hardware characteristics of a computing platform and instead presents an abstract platform that can host other platforms, including complete operating systems. One popular virtualization technique is to deploy a hypervisor (also known as a virtual machine manager) that can allow guest software (including complete operating systems) to run concurrently on an abstract host platform. The hypervisor can provide a simulated computing environment, often referred to as a "virtual machine," for its guest software. Thus, multiple disparate operating systems can run in separate virtual partitions under a hypervisor on a single chassis, for example.

However, virtual machines are likely to become more popular targets for malicious attacks as the number of deployed virtual machines increases. And while virtualization provides many advantages, it can also present unique security challenges. For example, external security software can receive notifications when events occur inside a virtual machine, and can retrieve memory contents and virtual processor state information from the virtual machine. However, existing techniques for enabling such notifications can adversely affect operating systems running on a virtual partition. Hence, many challenges remain for providing a secure virtualization platform.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 2 is a simplified block diagram illustrating additional details that may be associated with one potential embodiment of the virtualized platform;

DETAILED DESCRIPTION OF EXAMPLE EMBODIMENTS

Overview

A method is provided in one example embodiment that includes rebasing a module in a virtual partition to load at a fixed address and storing a hash of a page of memory associated with the fixed address. An external handler may receive a notification associated with an event affecting the page. An internal agent within the virtual partition can execute a task and return results based on the task to the external handler, and a policy action may be taken based on the results returned by the internal agent. In some embodiments, a code portion and a data portion of the page can be identified and only a hash of the code portion is stored.

In more particular embodiments, rebasing the module may include removing relocation data and modifying a header in the module to provide the fixed load address or patching a loader in an operating system to load the module at the fixed address. In some embodiments, the task can include identifying the module based on a virtual address associated with the page and/or identifying the page as a mixed use page.

Example Embodiments

Figure 1:
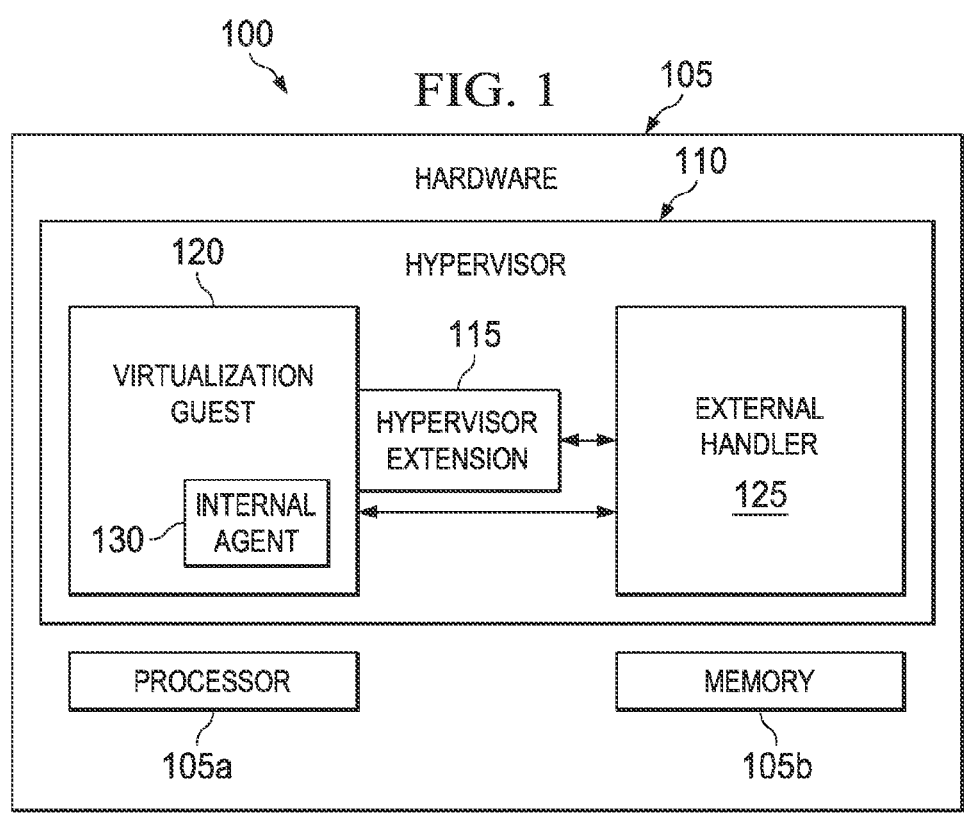
FIG. 1 is a simplified block diagram illustrating an example embodiment of a virtualized platform in which virtual partitions may be monitored in accordance with this specification.

Turning to FIG. 1, FIG. 1 is a simplified block diagram illustrating an example embodiment of a virtualized platform 100 in which virtual partitions may be monitored in accordance with this specification. Virtualized platform 100 includes hardware 105, a hypervisor 110, and a hypervisor extension module 115. In general, hardware 105 represents any machine or apparatus that is capable of accepting, performing logic operations on, storing, or displaying data, and may include without limitation a processor 105a and memory 105b. As used herein, the term "data" refers generally to any type of numeric, voice, video, or script data, or any type of source or object code, or any other suitable information in any appropriate format that may be communicated from one point to another in electronic devices and/or networks.

Virtualized platform 100 may have one or more virtual partitions, such as a virtualization guest 120 and an external handler 125. In some embodiments, hypervisor 110 may be a native or "bare metal" hypervisor that runs directly on hardware 105 (as illustrated in FIG. 1), but may alternatively run under host software (e.g., a virtualization host) executing on hardware 105. External handler 125 may communicate with hypervisor extension 115 through a registered callback, for example, as well as directly with internal agent 130 (i.e., bypassing hypervisor extension 115) through network communications, for example.

In general, a virtual partition may be an instance of a virtual machine, sandbox, container, or any other isolated environment, which can have software running within it. The software may include operating system and application software. To all software running within a virtual partition, though, the virtual partition may appear to be a distinct physical machine.

For purposes of illustrating the principles of monitoring virtual partitions in a virtualized platform such as platform 100, it is important to understand the activities and communications occurring within such a platform. The following foundational information may be viewed as a basis from which the present disclosure may be properly explained. Such information is offered earnestly for purposes of explanation only and, accordingly, should not be construed in any way to limit the broad scope of the present disclosure and its potential applications.

Some hypervisors may allow an external handler (i.e., software running outside of a given virtual partition) to receive notifications when certain events occur within the virtual partition, and to retrieve memory contents from the virtual partition. An "event," as used herein, may include any operation affecting memory, such as writing, reading, modifying, replacing, moving, deleting, or executing memory contents. Other types of events may include changes to memory attributes, such as making a region writable or executable, for example. An external handler may also be able to retrieve the state of virtual processors operating in the virtual partition.

For example, an external handler may register with a hypervisor extension to receive notifications of "page execution." Thus, when a virtual processor accesses a page of memory in order to execute an instruction within it, then the virtual processor may be halted and the external handler notified. In general, a page is a fixed-length block of memory. Page size is often determined by processor architecture.

In general, an external handler can operate at the level of the virtual hardware. Thus, an external handler may be limited to physical memory addresses and may have no information about how a guest operating system is managing the memory. However, an external handler typically has access to page tables, which are used for translating virtual memory addresses to physical memory addresses. Page tables are generally managed by an operating system, but may be used by a virtual processor, and are a link between physical addresses and virtual addresses.

To illustrate, consider an example with a page size of 4 kilobytes. A module can execute memory contents having a virtual address of 7ff0aa34, for example. Note that, as used herein, the term "module" is used in a broad sense to refer generically to a module, a process, application, executable file, library, function, subroutine, thread, task, instruction set, code block, or other similar operating unit. A virtual processor, using page tables, can convert that virtual address to a physical address of 0110aa34. A hypervisor can pause the virtual processor and notify an external handler that the physical page starting at address 011a000 has been accessed for execution. Note that the virtual address of the page may also be determined in such a scenario if the state of the virtual processor can be retrieved, since the instruction pointer of the processor should be the virtual address of the instruction that is executing (i.e., 7ff0aa34), which is in the page.

In the context of memory, it should be noted that a "virtual" address is not necessarily related to any given "virtual" machine. A computer, whether virtual or real, includes some amount of random access memory (RAM) and each byte of memory is associated with a unique address. For example, if a computer has 1 gigabyte of RAM, then the memory will include bytes with physical addresses in the range of 00000000 to 3fffffff. However, modern operating systems may use address translation features available in some processors to construct a virtual address space. For example, on a 32-bit processor, the operating system may construct a virtual address space of 4 gigabytes, so that applications and the operating system can use memory with virtual addresses in the range of 00000000 to ffffffff. In general, such an address translation is one-way; it may not be possible to quickly translate a physical address to a virtual address. Moreover, there may not be any virtual addresses corresponding to a given physical address, or there may be more than one virtual address corresponding to a given physical address.

A hypervisor may also implement additional security measures for monitoring memory, such as page whitelisting. Page whitelisting can be implemented in two phases. The first phase is a learning phase. A hypervisor can assume that a virtual machine is "clean" and starts monitoring all memory for execution access when the virtual machine is started. When a page is accessed for execution, the entire page may be retrieved and a hash of the page calculated. The hash is saved and the process may be repeated until some level of confidence is attained that all memory that can be executed has been executed. In the second phase, the virtual machine is assumed to be in a hostile environment (e.g., connected to a public network). All memory may again be monitored for execution access. If a page is accessed for execution, the entire page can be retrieved and a hash of the page calculated. This hash can be compared with the hashes calculated in the learning phase. If the hash does not match one of the learning phase hashes, then the hypervisor can take some appropriate policy action, such as halting the virtual machine, generating an alert, etc.

However, modules (e.g., executable files, dynamic libraries, drivers, etc.) may not occupy the same virtual memory addresses every time they run. But since some code may rely on knowing the virtual memory addresses, some operating systems (e.g., Microsoft Windows) may implement "relocations," in which a loader changes code to match the virtual address of a module where it is loaded into memory at runtime. For example, code on a disk may read: 0000100A mov eax,[00001023]. Thus, the instructions at offset 100A into the executable loads the EAX register with the contents of memory at virtual address 1023 and the relocation data of the executable contains an entry "100A." If the executable is loaded at virtual address 00400000, for example, the loader can change the code to read: 0040100A mov eax,[00401023]. Or if the executable is loaded at virtual address 00500000, the loader can change the code to read: 0050100A mov eax, [00501023]. Thus, this type of relocation scheme may not be compatible with hypervisor page whitelisting schemes since a page may contain different contents every time a machine is rebooted. Although the changes may be benign, a page whitelisting scheme may result in unnecessary alerts or processing.

Moreover, some software may also use a single page for both code and data, which may also be incompatible with page whitelisting since data changes frequently in most applications. Although newer processors may be designed to prevent mixed-use pages, some of the most common operating systems still continue to use pages mixed with code and data.

In accordance with embodiments described herein, virtualization platform 100 can overcome these shortcomings (and others) by providing an internal agent to augment page whitelisting schemes. In one particular embodiment, for example, an internal agent module can manage load addresses for modules to provide consistent module addresses. In another embodiment, an internal agent may provide post-processing of suspicious memory pages.

Managing load addresses may be achieved using a process generally referred to herein as "rebasing." An internal agent can "rebase" a module, which generally includes forcing a module to load at the same address every time the module is loaded, thereby eliminating or substantially reducing problems that may be associated with operating system relocation schemes. Using fixed load addresses also allows an internal agent to calculate hashes of executable pages before they are executed. Accordingly, processing time of the learning phase of page whitelisting may be shortened significantly.

In one example embodiment, rebasing may be achieved by modifying a module, such as by applying relocations to executable code in a file on disk, stripping relocation data from the file, and altering the file's header to indicate a fixed load address. Thus, after rebasing, an operating system may load the module at the fixed load address or not load it at all. Although in general a module can fail to load if something else already occupies the fixed load address, an internal agent can ensure that no such overlaps cause load failure.

In another example embodiment, rebasing can be achieved by patching loader code in an operating system that chooses a load address, altering it such that it chooses a single address for a given executable. The load address can be selected in a variety of ways. For example, a set of load addresses may be determined a priori to optimize memory layout. Alternatively, a load address may be generated from the name of the file (e.g., the 32-bit cyclic redundancy check (CRC) of the letters in the name "serial.sys" is 0xAC438F43, which can be used as the load address). Yet another alternative includes using the initial load addresses (i.e., as at installation), based on an assumption that the system is in a stable state at installation.

Code may also be rebased by accessing a virtual machine's disks while the virtual machine is powered down. In one embodiment, for example, data (i.e., code) may be accessed by parsing a virtual disk. Optionally, the virtual disk may be parsed by parsing virtual disk files of the virtual disk. For example, a file format used to encapsulate an image of the virtual disk (e.g., into a virtual disk file) may be parsed. To this end, the parsing may allow raw data sectors of the virtual disk to be identified.

In another example embodiment in which a virtual disk may be accessed while offline, raw data sectors may be parsed for identifying a partitioning of the virtual disk. In this way, the data may be accessed based on the partitioning of the virtual disk.

In yet another embodiment, the data in an offline virtual disk may be accessed based on a file system structure utilized by the virtual disk. For example, a file system (e.g., file allocation table (FAT) file system, New Technology File System (NTFS), hierarchical file system (HFS), third extended file system (ext3), etc.) utilized to format each identified partition of the virtual disk may be identified. Such a file system may be identified based on the further parsing of the data described above, as an option.

In still yet another embodiment, data in an offline virtual disk may be accessed utilizing a hierarchical directory associated with the file system. Such hierarchical directory may represent the file system, as an option. In this way, the data may be included in a hierarchical directory of the virtual disk. To this end, the hierarchical directory may be constructed according to the file system structure utilized by the virtual disk, such that the data may be accessed via the hierarchical directory.

In another embodiment, the data in an offline virtual disk may be accessed utilizing a registry of the virtual disk. For example, the data may be included in such registry. The further parsing of the data (e.g., the raw data sectors) described above may identify registry files included in such data. The registry files may therefore be used to construct a registry of the virtual disk, such that data within the registry may be accessed via the registry.

In yet another embodiment, the data in an offline virtual disk may be accessed by translating a path to the data. Such path may be translated from a path indicating a location on the physical system to a path indicating a location on the virtual disk. For example, if the data is accessed via the constructed registry, the path to the data may be translated into a path associated with the data actually stored in the registry of the virtual disk.

Preventing use of the virtual machine for accessing the data may optionally increase efficiency by allowing a rebasing operation to be performed without necessarily waiting for an operating system of the virtual machine to fully boot. As another option, preventing use of the virtual machine for accessing the data may limit processing and/or memory resources consumed. Further, in one embodiment, data on multiple virtual disks associated with different virtual machines on a single physical system may also be capable of being accessed in parallel (e.g., for installation of new applications, etc.), even when the physical system is incapable of executing such virtual machines in parallel.

In embodiments that include post-processing of suspect events, information about a memory page can be passed to an internal agent for further analysis, since there may be very limited information available to an external handler. For example, an external handler may only know the contents of a page being accessed, its physical address, and its virtual address. Other pages of memory may be inaccessible to an external handler, if for example they have been paged out by a guest operating system. Thus, an external handler, for example, may pass information about a memory page to an internal agent and request additional processing instead of instantly alerting about the presence of a previously unseen page.

It should be noted that a virtual processor that is attempting to execute an instruction (e.g., a suspect instruction) may be paused and, consequently, an internal agent may not be able to process such a request immediately. To enable additional processing, a process (or a thread in the process) that attempts to execute an instruction can be parked so that request can be processed immediately, or the virtual processor may be allowed to resume executing the instruction so that it (or another processor) can process the request eventually. Alternatively, the virtual processor can remained blocked if the virtual machine includes more than one virtual processor, and an internal agent can use a different virtual processor to process the request. In yet another alternative, an external handler can alter the state of a processor so that when it resumes it executes the internal agent code instead of code from the suspect memory page. Once an internal agent has processed the request, a processor can be paused again, returned to its pre-request state, and resumed. Each of these methods may be appropriate at different times, depending on the state of a processor and characteristics of a guest operating system. For example, if a processor is executing user-mode code, then the latter method may be preferable, but if it is processing a hardware interrupt, then the first method may be safest.

An internal agent may perform a variety of tasks on behalf of an external handler, such as identifying a module in which a memory page resides or identifying legitimate mixed use pages. Knowing a virtual address of a memory page can enable identification of an associated module.

For example, if an internal agent identifies the module as a particular driver known to have many mixed-use pages but otherwise safe, then an external handler can ignore access at a given virtual address associated with the driver without an alert. In another example, if an internal agent is unable to identify a module for a given virtual address, then an external handler may treat access at the virtual address as a potential rootkit attempting to hide itself. Moreover, an internal agent may also provide the name of a module to an administrator as needed for diagnostics, forensic analysis, and the like.

With respect to mixed-use pages, an internal agent may also examine header information for a module owning a given memory page, since an internal agent may access any virtual address. Thus, if a header identifies a memory page as being part of both code and data segments, for example, then an alert may be ignored. Further, an internal agent may identify which parts of a memory page are code and which are data, and provide this information to an external handler. The external handler may then hash only code portions of the page and more effectively identify changes to code in the page without regard to data changes. In some embodiments, identification and analysis of mixed-use pages can be done during a preprocessing stage.

Turning to FIG. 2, FIG. 2 is a simplified block diagram illustrating additional details that may be associated with one potential embodiment of hypervisor 110. FIG. 2 includes hypervisor extension module 115, virtualization guest 120, and external handler module 125. External handler 125 also may be a virtualization guest within hypervisor 110. Virtualization guest 120 and external handler 125 each may include a respective virtual processor 205*a-b* and various software elements (including distinct operating systems in certain embodiments). More particularly, virtualization guest 120 may include internal agent 130, a virtual disk 215, and a module 220. External handler 125 may also include or have access to a hash database 225. Hypervisor extension 115 may provide monitoring and execution control over module 220, and event callback to external handler 125 if an event triggers a notification. An inter-guest communication mechanism may enable direct communication between internal agent 130 and external handler 125.

In alternative embodiments, external handler 125 may reside within hypervisor 110 (outside of a virtual partition) or as a hypervisor extension. In yet other embodiments, external handler 125 may operate within the execution environment of a host operating system if, for example, hypervisor 110 is not an embedded hypervisor.

A module may access virtual disk 215 independent of virtualization guest 120 in certain embodiments. Such a module may include external handler 125 or any module capable of accessing data stored on virtual disk 215. In one embodiment, the module, virtual disk 215, and virtualization guest 120 may be located on a single device. Alternatively, the module may also be located on a device separate from another device on which virtual disk 215 and virtualization guest 120 are located.

In one embodiment, external handler 125 may parse data stored on virtual disk 215 for identifying raw data sectors of virtual disk 215. In another embodiment, external handler 125 may further parse the raw data sectors for identifying any partitions of virtual disk 215 and file systems utilized by such partitions. Accordingly, external handler may construct the data associated with each partition into a hierarchical data structure indicated by an associated file system.

Furthermore, external handler 125 may utilize the parsed raw data sectors for identifying registry files included in virtual disk 215. The registry files may optionally be utilized for constructing a registry used by the virtualization guest 120. To this end, external handler 125 may perform an operation on the constructed hierarchical data structure and/or registry independently of the virtualization guest 120.

In regards to the internal structure associated with virtual platform 100, hardware 105 can include memory elements (as shown in FIG. 1) for storing information to be used in the operations outlined herein. Additionally, virtual platform 100 may include a processor (also shown in FIG. 1) and one or more virtual processors that can execute software or an algorithm to perform activities as discussed herein. These devices may further keep information in any suitable memory element (random access memory (RAM), ROM, EPROM, EEPROM, ASIC, etc.), software, hardware, or in any other suitable component, device, element, or object where appropriate and based on particular needs. Any of the memory items discussed herein should be construed as being encompassed within the broad term 'memory element.' The information being tracked or sent by hypervisor 110, hypervisor extension 115, virtualization guest 120, or external handler 125 could be provided in any database, register, control list, or storage structure, all of which can be referenced at any suitable timeframe. Any such storage options may be included within the broad term 'memory element' as used herein. Similarly, any of the potential processing elements, modules, and machines described herein should be construed as being encompassed within the broad term 'processor.'

Note that in certain example implementations, the functions outlined herein may be implemented by logic encoded in one or more tangible, non-transitory media (e.g., embedded logic provided in an application specific integrated circuit (ASIC), digital signal processor (DSP) instructions, software (potentially inclusive of object code and source code) to be executed by a processor, or other similar machine, etc.). In some of these instances, a memory element (as shown in FIG. 1) can store data used for the operations described herein. This includes the memory element being able to store software, logic, code, or processor instructions that are executed to carry out the activities described herein. A processor can execute any type of instructions associated with the data to achieve the operations detailed herein. In one example, a processor (as shown in FIG. 1) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

Figure 3A:
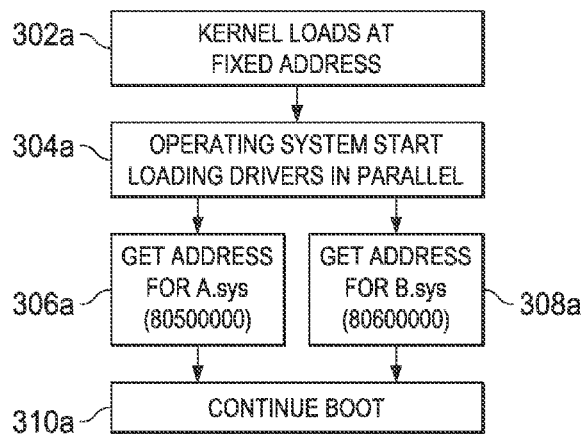
FIG. 3A is a simplified flowchart that illustrates potential operations that may be associated with loading drivers at a fixed address during a first boot of a virtual guest in the virtualized platform.
Figure 3C:
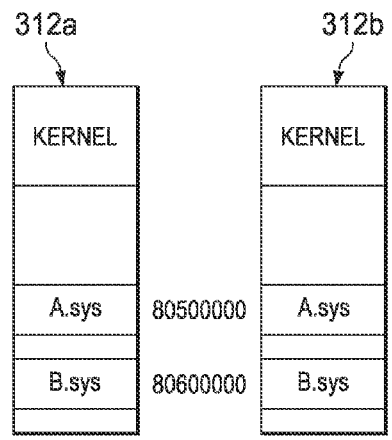
FIG. 3C is a simplified block diagram illustrating a memory map resulting from operations in FIG. 3A and a memory map resulting from operations in FIG. 3B.
Figure 3B:
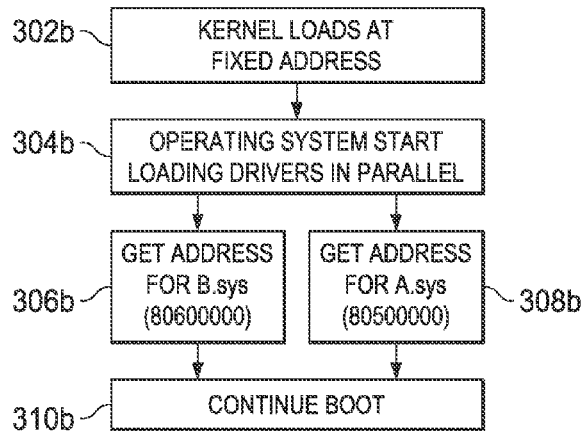
FIG. 3B is a simplified flowchart that illustrates potential operations that may be associated with loading drivers at a fixed address during a second boot of the virtual guest in the virtualized platform.

FIGS. 3A-3C illustrate potential operations and memory maps that may be associated with certain embodiments of virtual platform 100 in two scenarios. More particularly, FIG. 3A is a simplified flowchart that illustrates potential operations that may be associated with loading drivers at a fixed address during a first boot of a virtualization guest in virtual platform 100. FIG. 3B is a simplified flowchart that illustrates potential operations that may be associated with loading drivers at a fixed address during a second boot of the virtual guest.

Turning to FIG. 3A, a virtual guest may load a kernel at a fixed address at 302*a*. An operating system in the virtual guest may then start loading drivers in parallel at 304*a*. Thus, drivers may be loaded in arbitrary sequence. In the example of FIG. 3A, a driver named "A.sys" loads before a driver named "B.sys." Moreover, this example assumes that the preliminary rebasing operations result in a fixed load address of 80500000 for the A.sys driver, and a fixed load address of 80600000 for the B.sys driver. Thus, an internal agent can force A.sys to load at 80500000 at 306*a* and B.sys to load at 80600000 at 308*a*. The first boot process can resume at 310*a*.

FIG. 3B, in comparison, provides an example in which the B.sys driver is loaded by an operating system before the A.sys driver. Thus, the virtual guest can load the kernel at a fixed address at 302*b*. An operating system in the virtual guest may then start loading drivers in parallel at 304*b*. Again, drivers may be loaded in arbitrary sequence. This example assumes that the preliminary rebasing operations result in a fixed load address of 80500000 for the A.sys driver, and a fixed load address of 80600000 for the B.sys driver, as in the example illustrated by FIG. 3A. An internal agent can force B.sys to load at 80600000 at 306*b* and A.sys to load at 80500000 at 308*b*. The second boot process can resume at 310*b*.

FIG. 3C is a simplified block diagram illustrating a memory map 312*a* resulting from operations in FIG. 3A and a memory map 312*b* resulting from operations in FIG. 3B. As illustrated, memory map 312*a* is identical to memory map 312*b*, notwithstanding the different loading sequences of A.sys and B.sys.

Note that the operations illustrated by FIGS. 3A-3B may be preceded by certain preliminary operations for rebasing modules with a fixed address. In one particular embodiment, for example, an internal agent such as internal agent 130 may apply all relocations to executable code in a file on disk, strip relocation data from the file, and alter the file's header to indicate a fixed load address. In another embodiment, an internal agent can patch code in an operating system that chooses a load address, altering the loader such that it chooses a single address for a given executable. Moreover, once modules are rebased with a fixed load address, a hash can be calculated for all executable pages and stored in a hash database 300 before they are executed, which can substantially reduce the time required for the first "learning" phase of page whitelisting.

Figure 4:
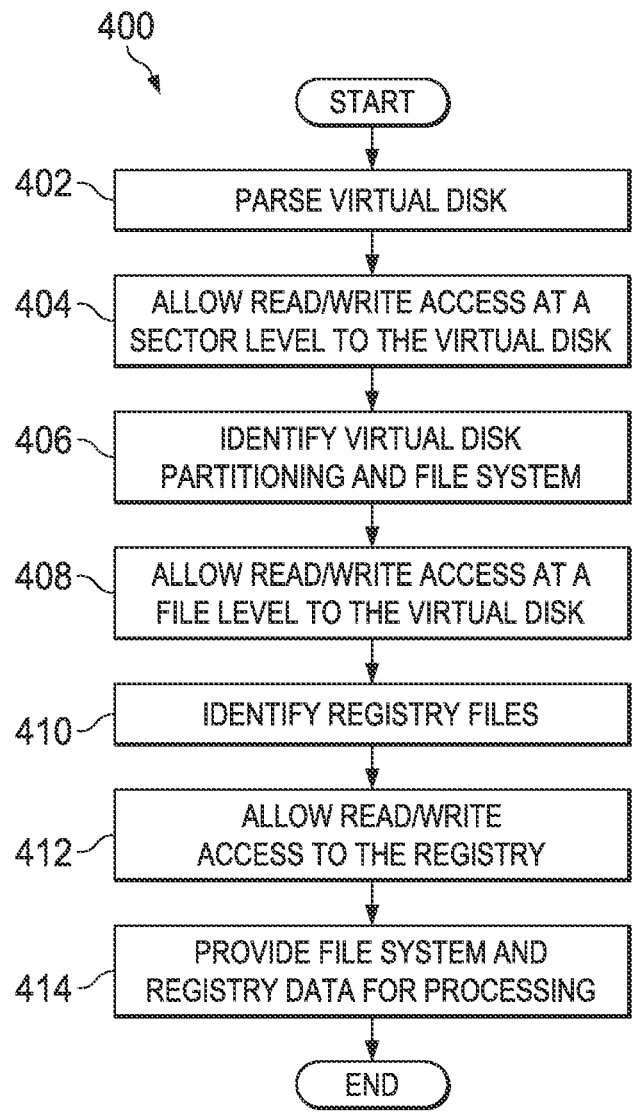
FIG. 4 is a simplified flowchart that illustrates potential preliminary operations that may be associated with rebasing modules in one potential embodiment of the virtualized platform.

FIG. 4 is a simplified flowchart 400 that illustrates potential preliminary operations that may be associated with rebasing modules with a fixed address by accessing a virtual machine's disks while the virtual machine is not operating in certain embodiments of virtual platform 100. At 402, a virtual disk can be parsed. In one embodiment, the virtual disk may be parsed by parsing files located on the virtual disk. Such virtual disk files may be encoded (i.e., formatted) for encapsulating an image of the virtual disk. For example, the virtual disk files may be encoded in any desired format. In various embodiments, the virtual disk files may be encoded utilizing a virtual machine disk format (VMDK), virtual hard disk format (VHD), etc.

Optionally, the virtual disk files may be sparse. Just by way of example, such virtual disk files may not necessarily contain every sector that makes up the virtual disk, but instead may only include the sectors that have been written to. A sector that is non-existent with respect to a virtual disk file may indicate that the sector has never been used and that a virtual machine associated with the virtual disk may provide a sector full of zeroes if the sector is read.

To this end, parsing the virtual disk may include parsing the encoding of, or otherwise decoding, the virtual disk files to identify data stored in such files. For example, the data may be in the form of raw data sectors. In this way, raw data sectors of the virtual disk may be identified from files stored on the virtual disk.

Additionally, read and write access to the virtual disk can be provided at a sector level at 404. Just by way of example, by virtue of identifying the raw data sectors, read and write access to such raw data sectors may be provided. The read and write access may allow operations to be performed on the raw data sectors, in one embodiment.

Further, at 406, partitions of the virtual disk and file systems utilized by any of such partitions may be identified. For example, the virtual disk may be partitioned and each partition may be formatted with one of any number of file systems (e.g., FAT, NTFS, HFS, ext3, etc.). Thus, a file system utilized by the virtual machine may be indicated by the identified partitions and associated file systems.

To this end, the raw data sectors may be accessed for identifying the partitions and associated file system structures. For example, parsing the raw data sectors may provide the partitions and associated file systems utilized by the virtual disk. It should be noted that the raw data sectors may be parsed in any desired manner.

In one embodiment, the raw data sectors may be directly parsed (e.g., parsed manually). In another embodiment, the raw data sectors may be parsed utilizing an operating system of a physical system on which the virtual disk is located. For example, the virtual disk may be indicated to the operating system as a physical disk, such that file systems of the operating system may mount partitions of the virtual disk. Of course, it should be noted that the raw data sectors may be parsed both directly and via the operating system, such as, for example, where the file system used on the virtual disk is not one that is capable of being utilized by the operating system.

Still yet, at 408 read and write access of the data stored on the virtual disk can be allowed at a file level. For example, such read and write access may be allowed at the file level utilizing the identified partitions and associated file systems. In one embodiment, the identified partitions and associated file systems may be utilized for constructing the data in each partition according to an associated file system. Thus, for example, a hierarchical data structure (e.g., directory structure, etc.) of the data may be constructed, such that the read and write access to the data may be provided via the hierarchical data structure. As an option, the hierarchical data structure may represent the file system utilized by the virtual machine.

Additionally, registry files can be identified at 410. The registry files may include any files stored on the virtual disk that are utilized as a registry by the virtual machine. Such registry files may be identified in any desired manner.

In one embodiment, the registry files may be identified by parsing the raw data sectors optionally identified at 402. In another embodiment, the registry files may be identified by parsing the hierarchical data structure optionally constructed at 408. For example, a portion of the hierarchical data structure may include the registry files.

Optionally, the parsing may be directly (e.g., manually) performed. As another option, the parsing may be performed at least partially by the operating system of the physical system. For example, the operating system may be instructed to load file system data (identified at 406) for parsing such file system data.

Further, the registry may be constructed utilizing the identified registry files. Just by way of example, the registry files may be loaded into a portion of a physical registry of the physical system. A number of keys and links may then be set in another portion of the physical registry to emulate the registry included in the virtual disk that is utilized by the virtual machine. In this way, the physical registry may include the registry utilized by the virtual machine.

Read and write access to the registry may be allowed at 412. For example, access to data stored in the virtual disk may be provided at a registry level. File system and registry data can be provided for processing at 414. For example, access to the constructed file system and the constructed registry may be allowed.

As an option, the file system and registry data may be translated prior to rebasing. For example, the file system and registry data may be translated to provide the file system and registry data in a format capable of being processed by external handler 125, in one embodiment. Just by way of example, a value in the virtual machine registry may refer to a file called "c:\windows\something.dll". However, from the point of view of the virtual machine, "c:\windows\something.dll" may be its own file, such that a translation of the path may be utilized for preventing such file from being confused with the "\windows\something.dll" that is present on the virtual disk.

In one embodiment, external handler 125 may translate file system and registry data. For example, application program interfaces (APIs) may be provided with external handler for performing the translation. In another embodiment, external handler 125 may continue to use path names it understands (e.g., C:\windows\something.dll, HKLM\Software\Microsoft). However, the path names may be translated into accesses against the virtual disk and registry. For example, APIs that external handler 125 calls may be hooked for performing the translation. As another example, if the operating system of the physical system is utilized in accessing the data stored on the virtual disk (e.g., as at 402 and 406), interception functions provided by the operating system may intercept application calls such that the operating system may perform the translations.

Figure 5:
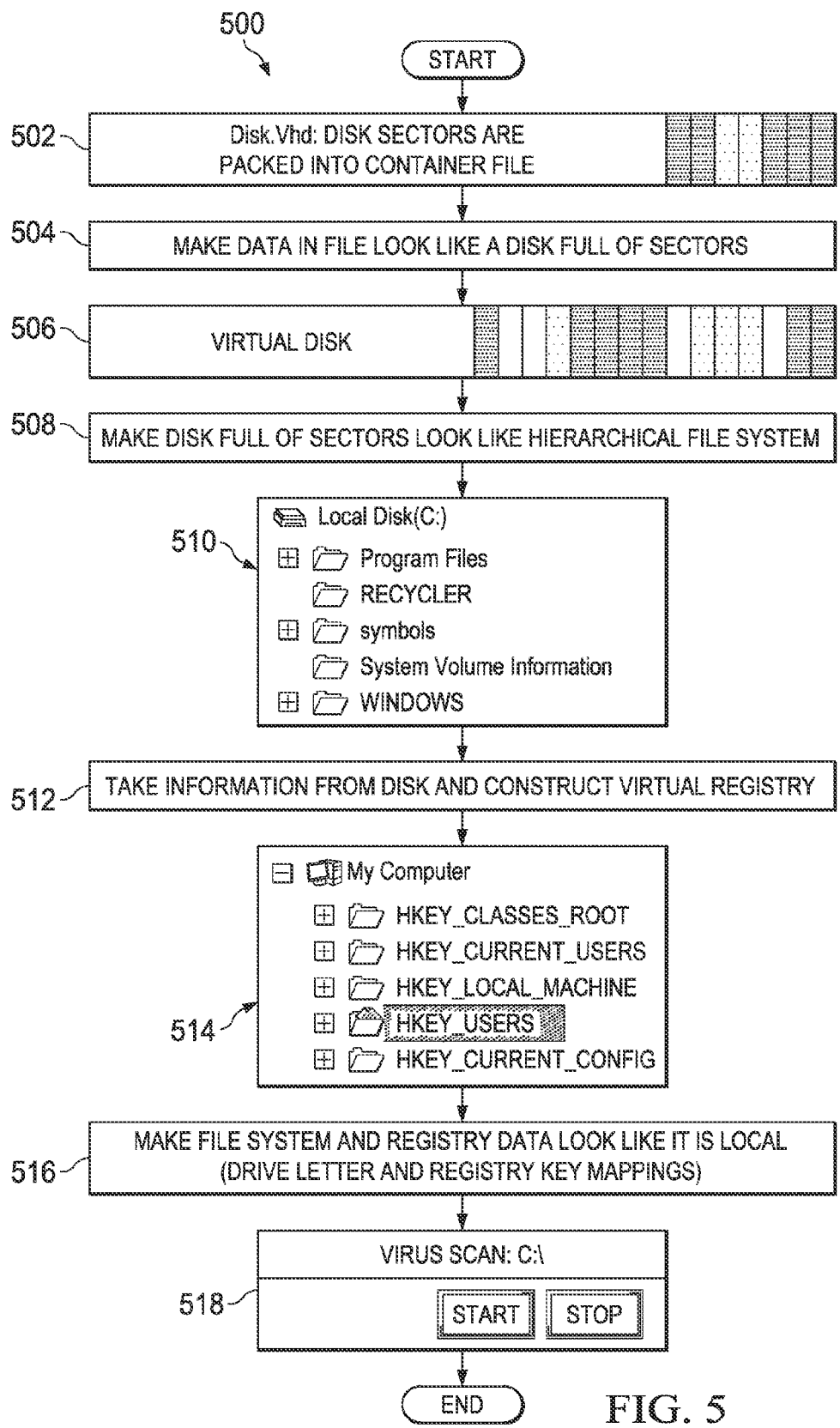
FIG. 5 is a simplified flowchart that illustrates potential operations that may be associated with constructing virtual file system and registry data independently of a virtual machine in example embodiments of the virtual platform.

FIG. 5 is a simplified flowchart 500 that illustrates potential operations that may be associated with constructing virtual file system and registry data independently of a virtual machine in one example embodiment of virtual platform 100. At 502, sectors of a virtual disk may be packed into a container file. The sectors may store any data associated with a virtual machine that utilizes the virtual disk. In addition, the container file may include a virtual disk file that encapsulates an image of the virtual disk. At 504, data in the container file can be made to appear as though the virtual disk is filled with sectors. For example, if a sector of the virtual disk has not yet been written to, such sector may not exist in the virtual disk. Thus, in one embodiment, a non-existent sector may be created at 506. For example, the created sector may be filled with zeroes.

Additionally, the virtual disk that is full of sectors can be made to appear as a hierarchical file system at 508. In one embodiment, the hierarchical file system may include a directory of the data stored in the virtual disk. Optionally, raw data sectors of the virtual disk may be parsed for identifying partitions of the virtual disk and file systems associated with such partitions. The identified partitions and associated file systems may thus be utilized for constructing the hierarchical file system.

An exemplary image of a hierarchical file system constructed utilizing the sectors of the virtual disk is illustrated at 510. As shown, the hierarchical file system may represent a drive included in the virtual disk, along with various files within such drive. Of course, it should be noted that the hierarchical file system may include any information stored on the virtual disk.

Still yet, information from the virtual disk can be utilized to construct a virtual registry at 512. In one embodiment, the hierarchical file system may be utilized for identifying registry files stored on the virtual disk. Such registry files may thus be utilized for constructing the virtual registry. 514 illustrates an example of a registry constructed from information stored on the virtual disk.

Moreover, the file system data and registry data can be made to appear local to the virtual disk at 516. As shown, a drive letter mapped to the hierarchical file system may include a drive that is local to the virtual disk. In addition, registry keys included in the registry may be mapped to data stored in the virtual disk. 518 shows an example of a local disk drive that is mapped to a hierarchical file system being scanned for viruses. To this end, rebasing may be performed on the hierarchical file system and/or the registry of the virtual disk independent of the virtual machine associated with such virtual disk.

Figure 6:
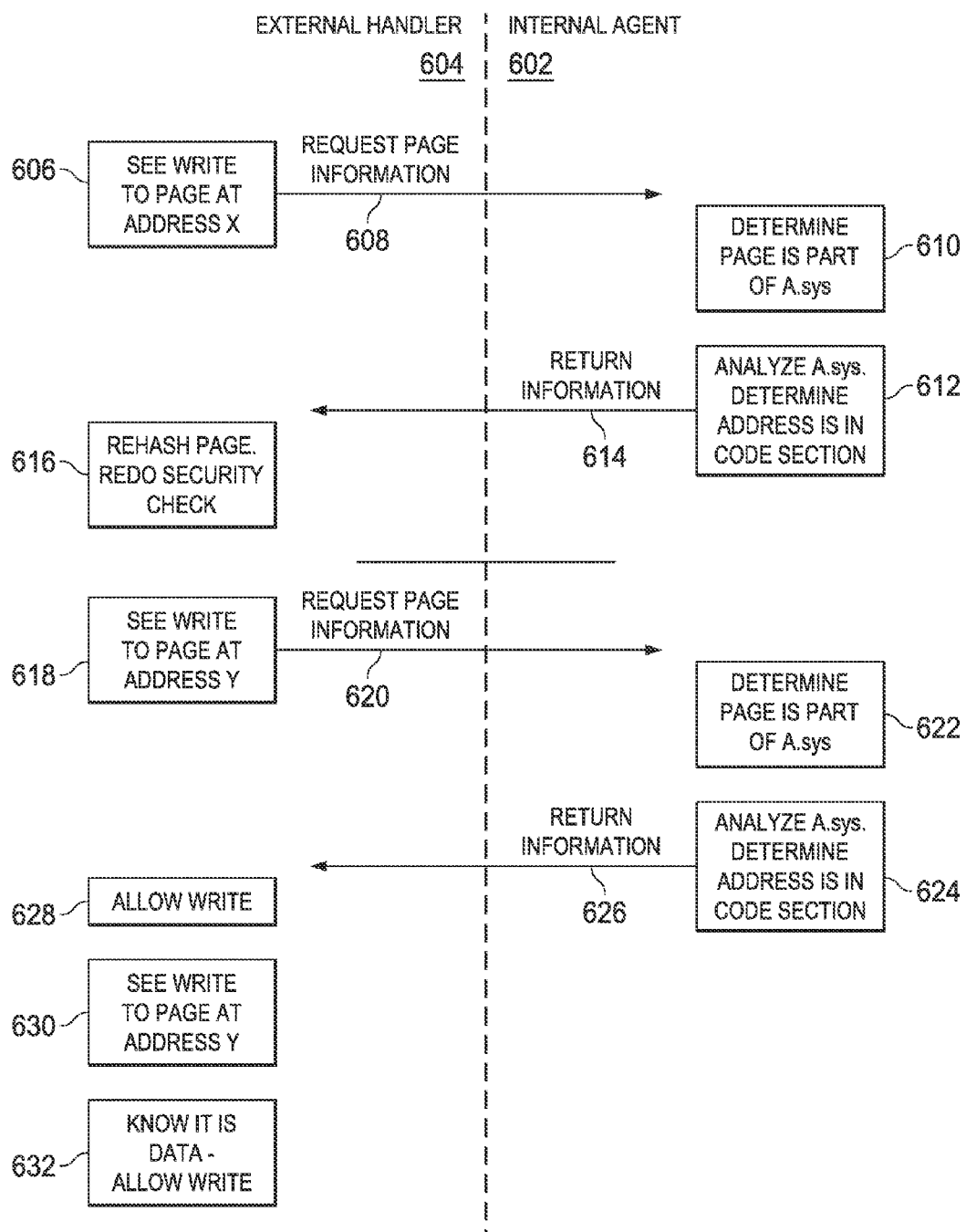
FIG. 6 is a simplified interaction diagram that illustrates potential operations that may be associated with example embodiments of an internal agent and an external handler in the virtualized platform.

FIG. 6 is a simplified interaction diagram that illustrates potential operations that may be associated with example embodiments of an internal agent 402 and an external handler 604. More particularly, FIG. 6 illustrates a scenario in which internal agent 602 can provide security and performance information to external handler 604 for mixed pages. At 606, for example, external handler 604 may receive notification of a write operation to a page at address X and request additional page information from internal agent 602 at 608. Internal agent 602 can determine the page is part of the driver A.sys (see FIGS. 3A-3c) at 610. At 612, A.sys can be analyzed to determine if the address X is in a code section or a data section of A.sys. In this example, it is determined that the address X is in a code section of A.sys. Thus, internal agent 602 can signal to external handler 604 that address X is in the code section at 614. At 616, external handler 604 may rehash the page and evaluate the security risk. Appropriate remedial actions may be taken by external handler 604 based on a relevant preconfigured policy and the results of evaluating the security risk.

At 618, external handler 604 may receive notification of a write operation at address Y and request additional information about the page at 620. Internal agent 602 can identify the page as part of A.sys at 622 and determine that the address is in a data section of A.sys at 624. This information can be returned to external handler 604 at 626. In this example, external handler 604 may allow the write operation at 628, since such operations are expected in a data section. External handler 604 may also receive subsequent notifications of write operations to address Y at 630, but these subsequent operations may be allowed at 632 without further interaction with internal agent 602 since the address is known to be in a data section of the A.sys driver.

Thus, virtual platform 100 can provide many significant advantages, particularly with respect to page whitelisting in a virtualized environment. For example, virtual platform 100 can enable preprocessing of modules to substantially reduce or eliminate the learning phase for page whitelisting. Moreover, virtual platform 100 can substantially reduce or eliminate noise, false positives, and security holes caused by module relocation and mixed-use pages, while providing better information about potential threats to administrators.

It is important to note that the steps in the appended diagrams illustrate only some of the possible scenarios and patterns that may be executed by, or within, virtual platform 100. Some of these steps may be deleted or removed where appropriate, or these steps may be modified or changed considerably without departing from the scope of teachings provided herein. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by virtual platform 100 in that any suitable arrangements, chronologies, configurations, and timing mechanisms may be provided without departing from the teachings provided herein.

Moreover, the principles described herein are readily applicable to other monitoring systems in which a callback or other event notification may be delivered from a guest or specialized container to a handler having a different context, such as for document control, auditing, forensics, and performance monitoring, for example.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
identifying a module to be loaded;
determining a fixed address in the virtual partition wherein a previous instance of the module was loaded at the fixed address;
rebasing the module in a virtual partition to load at the fixed address, including:
determining file information for the module;
removing relocation data from the module; and
modifying a header in the module to specify the fixed address;
storing a hash of a page of memory associated with the fixed address after modifying the header;
receiving in an external handler a notification associated with an event affecting the page;
instructing an internal agent within the virtual partition to execute a task and return results based on the task to the external handler; and
taking a policy action based on the results returned by the internal agent using the hash based at least upon the fixed address.

2. The method of claim 1, wherein the external handler operates in a second virtual partition.

3. The method of claim 1, wherein the external handler operates in a virtualization host.

4. The method of claim 1, wherein:
the external handler operates in a first virtualization guest in a virtualized platform; and
the virtual partition is a second virtualization guest in the virtualized platform.

5. The method of claim 1, wherein the event notification is received from a hypervisor extension in a virtualized platform.

6. The method of claim 1, wherein rebasing the module comprises patching a loader in an operating system to load the module at the fixed address.

7. The method of claim 1, wherein the task comprises identifying the module based on a virtual address associated with the page.

8. The method of claim 1, wherein the task comprises identifying the page as a mixed use page.

9. The method of claim 1, wherein storing a hash comprises identifying a code portion and a data portion of the page and storing only a hash of the code portion.

10. The method of claim 1, further comprising:
parking a thread associated with the module that caused the event; and
resuming other threads in the virtual partition after parking the thread that caused the event.

11. Logic encoded in one or more non-transitory media that includes code for execution and when executed by one or more processors is operable to perform operations comprising:
identifying a module to be loaded;
determining a fixed address in the virtual partition wherein a previous instance of the module was loaded at the fixed address;
rebasing the module in a virtual partition to load at the fixed address, including:
determining file information for the module;
removing relocation data from the module; and
modifying a header in the module to specify the fixed address;
storing a hash of a page of memory associated with the fixed address after modifying the header;
receiving in an external handler a notification associated with an event affecting the page;
instructing an internal agent within the virtual partition to execute a task and return results based on the task to the external handler; and
taking a policy action based on the results returned by the internal agent using the hash based at least upon the fixed address.

12. The encoded logic of claim 11, wherein the task comprises identifying the module based on a virtual address associated with the page.

13. The encoded logic of claim 11, wherein the task comprises identifying the page as a mixed use page.

14. An apparatus, comprising:
a virtual partition;
an internal agent within the virtual partition;
an external handler; and
one or more processors operable to execute instructions associated with the virtual partition, the internal agent, and the external handler such that the apparatus is configured for:
identifying a module to be loaded;
determining a fixed address in the virtual partition wherein a previous instance of the module was loaded at the fixed address;
rebasing the module in a virtual partition to load at the fixed address, including:
determining file information for the module;
removing relocation data from the module; and
modifying a header in the module to specify the fixed address;
storing a hash of a page of memory associated with the fixed address after modifying the header;
receiving in the external handler a notification associated with an event affecting the page;
instructing the internal agent within the virtual partition to execute a task and return results based on the task to the external handler; and taking a policy action based on the results returned by the internal agent using the hash based at least upon the fixed address.

15. The apparatus of claim 14, wherein rebasing the module comprises patching a loader in an operating system to load the module at the fixed address.

16. The apparatus of claim 14, wherein the task comprises identifying the module based on a virtual address associated with the page.

17. The encoded logic of claim 11, wherein the operations further comprise, each time an instance of the module is to be loaded in the virtual partition, rebasing the instance of the module in the virtual partition at the fixed address.

18. The method of claim 1, wherein rebasing the module in a virtual partition to load at the fixed address includes forcing the module to load at the same fixed address every time the module is loaded.

19. Logic encoded in one or more non-transitory media that includes code for execution and when executed by one or more processors is operable to perform operations comprising:

identifying a module to be loaded;

determining a fixed address in the virtual partition wherein a previous instance of the module was loaded at the fixed address;

rebasing the module in a virtual partition to load at the fixed address, including:

patching a loader in an operating system to load the module at the fixed address; and upon launching the module, causing the loader to select the fixed address to load the module;

storing a hash of a page of memory associated with the fixed address after patching the loader;

receiving in an external handler a notification associated with an event affecting the page;

instructing an internal agent within the virtual partition to execute a task and return results based on the task to the external handler; and taking a policy action based on the results returned by the internal agent using the hash based at least upon the fixed address.

* * * * *